US008179239B2

(12) United States Patent
Chen et al.

(10) Patent No.: US 8,179,239 B2
(45) Date of Patent: May 15, 2012

(54) DRIVING SAFETY AUXILIARY NETWORK ADMINISTRATION SYSTEM AND METHOD THEREOF

(75) Inventors: Bo-Chiuan Chen, Taiping (TW); Liang-Yu Ke, Kaohsiung (TW)

(73) Assignee: Automotive Research & Testing Center, Lugang Chen, Changhua Hsien (TW)

( * ) Notice: Subject to any disclaimer, the term of this patent is extended or adjusted under 35 U.S.C. 154(b) by 520 days.

(21) Appl. No.: 12/378,800

(22) Filed: Feb. 19, 2009

(65) Prior Publication Data

US 2010/0207786 A1 Aug. 19, 2010

(51) Int. Cl.
*B60Q 1/00* (2006.01)

(52) U.S. Cl. ......... 340/435; 340/438; 340/903; 701/301

(58) Field of Classification Search .................. 340/903, 340/988, 426.16, 426.19, 426.22, 435, 961, 340/425.5, 438; 701/301; 342/457
See application file for complete search history.

(56) References Cited

U.S. PATENT DOCUMENTS

| | | | | |
|---|---|---|---|---|
| 6,236,337 | B1 * | 5/2001 | Beier et al. | 340/905 |
| 7,239,228 | B2 * | 7/2007 | Kim et al. | 340/10.2 |
| 2005/0088318 | A1 * | 4/2005 | Liu et al. | 340/902 |
| 2005/0197771 | A1 * | 9/2005 | Seick et al. | 701/301 |
| 2007/0162550 | A1 * | 7/2007 | Rosenberg | 709/206 |
| 2008/0097699 | A1 * | 4/2008 | Ono | 701/300 |

* cited by examiner

*Primary Examiner* — Brent Swarthout
(74) *Attorney, Agent, or Firm* — Charles E. Baxley

(57) ABSTRACT

This specification discloses a driving safety auxiliary network administration system and the method thereof. Vehicles in motion communicate with each other about their geographical locations and current moving states within a communication range. At least one of the vehicles in the communication range becomes the router of several other vehicles that are at dead corners of wireless communications. The router is responsible for transferring vehicle state signals of those vehicles out of direct communications between them. Therefore, all the vehicles in the communication range are not blocked by terrains, buildings or other vehicles. All of them are taken into account to assess and find possible dangerous vehicles. This technique can effectively solve the problem of dead corners in driving safety auxiliary network communications. Highly important packets can be immediately and reliably transmitted to the corresponding vehicles, providing efficient warnings.

10 Claims, 16 Drawing Sheets

DRIVING SAFETY AUXILIARY NETWORK ADMINISTRATION SYSTEM AND METHOD THEREOF

BACKGROUND OF THE INVENTION

1. Field of the Invention

The invention relates to a driving safety auxiliary communication system and, in particular, to an administration system and method for the communications in a driving safety auxiliary communication system.

2. Description of Related Art

Most traffic accidents are resulted from dangerous driving happened in random. And the reactions of drivers to the dangerous driving often determine whether the trifling potential traffic accident will happen and whether it will become a major traffic accident.

As vehicle computers become popular, vehicles are equipped with more electronic functions, such as driving record, abnormal condition record, auto braking, parking distance control (PDC), and vehicle condition communications. The PDC function can directly notify the driver about objects that are too close to the vehicle, helping the driver to maneuver the vehicle safely. However, the PDC device only provides warnings about obstacles within a certain range when the driver backs the vehicle. It cannot provide the driver sufficient reaction time when the vehicle moves forward or another vehicle suddenly approaches. Therefore, drivers currently cannot know in advance possible dangerous driving on the street and have sufficient time to avoid traffic accidents.

In the wake of this, some people have proposed to install wireless communication devices inside vehicles and use a specific communication protocol in between, so that each vehicle and its neighboring vehicles can form a mobile wireless network and broadcasts message to exchange messages to each other. As a consequence, each vehicle obtains broadcast message of moving states of the other vehicles, achieving pre-warning effects.

A conventional system is used to exchange vehicle messages between vehicles in a specific network. Each vehicle has a controller, a sensing unit, a display, and a communicator. The sensing unit further includes a GPS receiver, a gyroscope, an acceleration sensor, a weather sensor, and an electronic map. The controller collects the road information, road curvature, and current traffic light obtained by the electronic map along with the current speed, direction, braking light, turning light, etc obtained by the sensing unit. Through the wireless communication device installed on the vehicle, the controller broadcasts the driving messages of the vehicle. Each of the neighboring vehicles can receive the driving messages of that vehicle. Moreover, through safety determining logic of its own, each vehicle determines the driving states of adjacent vehicles. If any neighboring vehicles were driving abnormally, it sends a warning to the corresponding driver. Therefore, in addition to broadcasting driving messages, each vehicle can further obtain the driving messages transmitted from neighboring vehicles. Consequently, as shown in FIG. 15, if there is a car 50' in an accident in the front, it can transmit such driving message to neighboring vehicles 51', which then relay the message to vehicles 52' further back.

Based on foregoing description, each vehicle simply and continuously broadcasts own driving messages or receives the driving messages of others. When the number of vehicles increases, it may happen that message packets jam the network so that the messages often collide and fail in transmissions. Once some packets of the driving messages fail to transmit, they have to wait a certain time to be resent. This loses the desired real-time exchanges of driving messages. Therefore, the above-mentioned system cannot provide complete anti-collision warnings.

Another technique of a vehicle to vehicle communication protocol is primarily used as a communication protocol in the driving information management system of the above-mentioned system. The communication protocol can determine the priorities of messages generated by a vehicle before sending them out. By improving the usage efficiency of the limited channel bandwidth, this technique can avoid failures of sending highly important driving messages. To further enhance the packets delivery rate, the driving messages with high importance will be broadcasted longer time and more trials than that of low-priority ones. This communication protocol further classifies the priorities of driving conditions on highways to reduce the quantity of packets and avoid the possibilities of packet collisions. For example, suppose one drives on a highway and there is a traffic accident in the front. The vehicle in the front sends a high priority message to neighboring vehicles in the back, notifying the drivers thereof and preventing car accidents. Since this is designed for highway driving, the importance of driving messages is classified according to the changes in the behavior of drivers.

With reference to FIG. 16, the communication protocol proposed in the above-mentioned communication protocol has a more prominent effect on vehicles running on highways or expressways. When the vehicle in the front 61' accelerates relative to the current vehicle 60', the current vehicle 60' receives the driving messages about the changed driving behavior of the front vehicle. Since front vehicle 61' is in front of the current vehicle 60', the current vehicle 60' evaluates that the front vehicle 61' has a high correlation with the current vehicle 60'. Immediately, the current vehicle 60' determines that the front vehicle has a potential danger and warns the driver of the current vehicle about the situation.

The above description indicates that there are technologies about forming a mobile wireless network among vehicles. By exchanging driving messages, the information of potentially risky road or vehicle conditions can be rapidly distributed. It can even evaluate potentially dangerous vehicle to the current vehicle. Nevertheless, the above-mentioned two technologies cannot be applied to all kinds of road conditions. In particular, when the wireless communication network is blocked by terrains, the above-mentioned effects of those technologies cannot be achieved. Therefore, it is imperative to provide a more effective and reliable wireless communication system for drivers.

SUMMARY OF THE INVENTION

In view of the foregoing, an objective of the invention is to provide a driving safety auxiliary network administration system and the method thereof, so that vehicles can conveniently exchange information among themselves in every kind of terrain. This increases the safety of driving.

To achieve the above-mentioned objective, the disclosed driving safety auxiliary network administration method comprises steps of:

continuously transmitting driving messages of the current vehicle and receiving driving messages of other vehicles, the driving message including at least speed, direction, and position etc. information;

using the received driving messages of other vehicles to determine whether they are potentially dangerous to the current vehicle and sending out a warning if any of them is dangerous;

determining whether the driving messages of other vehicles are broadcast from a primary node;

if the driving messages are not broadcast from the primary node, accumulating the amount of the driving messages broadcast from other secondary nodes within a predetermined time, broadcasting to all the accumulated amount of the driving messages after the predetermined time is reaches, and using the secondary node with the highest accumulated amount of the driving messages as the primary node; wherein the new primary node obtains a possible path of a secondary node from the received driving message, determines at least one threat correlation group, compares the urgencies of the threat correlation groups and weighs them with different priorities, selects the threat correlation groups with high priorities and transfers broadcasting packets about those groups, confirms acknowledging packets (ACK) from the secondary nodes of the threat correlation groups according to the priorities, and repeats the transmission of broadcasting packets to the secondary nodes in those threat correlation groups until ACK's are received from them; and if the driving messages are broadcast from the primary node, receiving the driving messages broadcast from the primary node and other secondary nodes in addition to continuously broadcasting the own driving messages of the current vehicle, applying an anti-collision algorithm to the driving message broadcast from the primary and secondary nodes, and warning the driver.

The disclosed driving safety auxiliary network administration system comprises:

a plurality of secondary nodes linking to each other to form a mobile network, each of which broadcasts the own driving message of the current vehicle, receives the driving messages from mother secondary nodes, and determines and warns about a potential danger according to the driving message of other secondary nodes;

a primary node, which is linking to the secondary nodes to collect the driving messages from them and is assigned according to a primary node selection procedure;

wherein the primary node applies an anti-collision algorithm to the driving messages of vehicles to obtain possible paths of the secondary nodes, thereby determining threat correlation among the vehicles as secondary nodes and forming at least one threat correlation group; different threat correlation groups are given with different priorities according to their urgencies for the primary node to select the threat correlation groups with high priorities and transfer broadcasting packets to them, so as to decrease package numbers broadcast among the primary and secondary nodes; the primary node then checks according to the priorities whether the secondary nodes of those threat correlation groups have received the broadcasting message through acknowledge packets, thereby determining whether each secondary node in the threat correlation groups receives the driving messages of others; and if not, the primary node continuously transmits the broadcasting packets to the threat correlation groups to increase the communication reliability. After the second node receives the broadcasting packets, the secondary node automatically sends an ACK response to the primary node and determines and warns about a potential danger according to the driving message of other secondary nodes according to the broadcasting packets.

When the invention is applied to crossroads or exits with traffic jams, there must be some primary node with better communications with others. The primary node can collect the driving information from nearby secondary nodes and performs an anti-collision algorithm to establish at least one threat correlation group. Broadcasting packets are filtered according to their priorities in order to reduce the amount of broadcasting packets among the vehicles. To ensure that the secondary nodes in each threat correlation group can successfully receive the broadcasting packets, the primary node confirms with them by receiving an acknowledging packet ACK automatically returned from the secondary node that receives the broadcasting packet. This increases the reliability in information exchanges. Therefore, the disclosed driving safety auxiliary administration method can effectively solve the problem of difficult to warn when there are obstacles at crossroads. This method also makes sure that the secondary nodes in each threat correlation group can receive important broadcasting packets within the shortest time by employing a most efficient and reliable communication method. Therefore, the warning of the invention is timely and effective.

DETAILED DESCRIPTION OF THE PREFERRED EMBODIMENT

Figure 1:
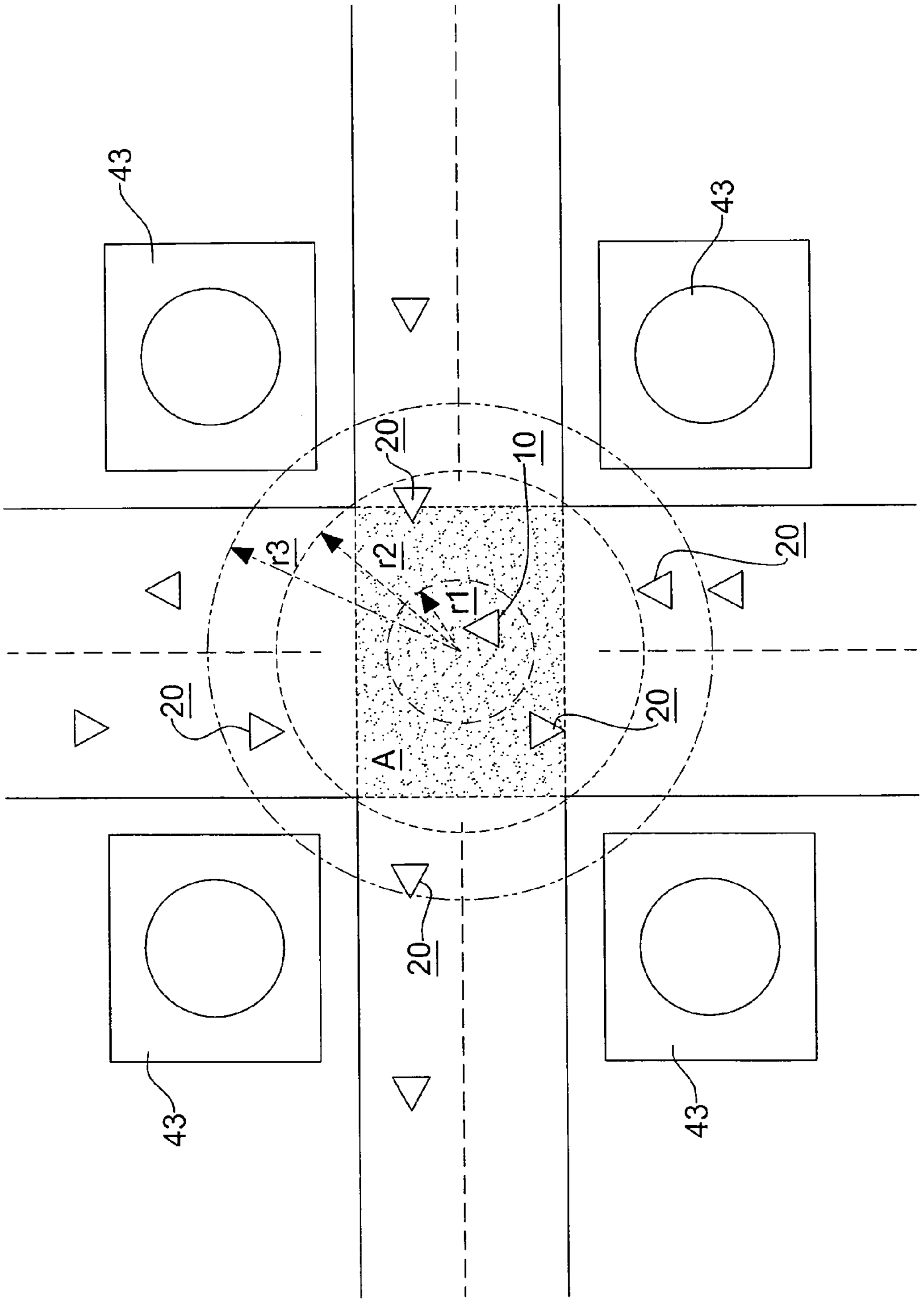
FIG. 1 is a schematic view of the invention used at a crossroad.

FIG. 1 shows a structure of the first embodiment of the disclosed driving safety auxiliary network administration system. Since crossroads are places where many vehicles gather and thus more likely to have accidents. To elucidate the effects of the invention, the following description uses a crossroad as an example to explain the disclosed network administration system and method.

The disclosed driving safety auxiliary network administration system is formed when vehicles enter the communication range of a crossroad and has multiple secondary nodes 20 and one primary node 10.

The secondary nodes 20 are linking with each other in the effective communication range of the crossroad. Each of the secondary nodes 20 broadcasts own driving message, receives the driving messages from other secondary nodes 20. The secondary node 20 referred herein is the vehicle within the effective communication range. It determines and warns about a potential danger according to the driving messages of other vehicles.

The primary node 10 is linked with the secondary nodes 20 within the effective communication range of the crossroad to collect the driving messages from them. It is assigned according to a primary node selection procedure. The primary node 10 applies an anti-collision algorithm to the driving messages of vehicles to obtain possible paths of the secondary nodes 20, thereby determining threat correlations among the vehicles and forming at least one threat correlation group. The driving message includes speed, direction, or location of a secondary node 20. After obtaining the driving messages of the secondary nodes, the primary node 10 compares the urgencies of different threat correlation groups and gives them different priorities. It then selects the threat correlation groups with high priorities and transfer broadcasting packets to them. The primary node then checks according to the priorities whether the secondary nodes 20 of those threat correlation groups have received the broadcasting message through acknowledging packets, thereby determining whether each secondary node 20 in the threat correlation groups receives the driving messages of others. This technique increases the communication reliability. In this embodiment, the primary node 10 is a vehicle in motion. The priorities determined by the primary node 10 can be inferred from such parameters as collision probability, vehicle type, and time to collision. An explicit example is given in the following table:

| Priority | Collision probability | Vehicle type | Time to collision t (second) |
|---|---|---|---|
| High | 90% | Special vehicle | t < 10 |
| Medium | 60% | Normal | t > 10 |
| Low | 30% | Normal | t > 20 |

Since most crossroads have buildings 43 around, they generally block the broadcasting of vehicles on different lanes. As a result, vehicles entering the crossroad sometimes cannot successfully receive the driving messages of other approaching vehicles. In this case, if a vehicle in the opposite lane or in the perpendicular direction may become a threat, it is impossible to determine and warn the driver in advance. According to the disclosed driving safety auxiliary network administration system, the primary node 10 establishes threat correlation groups when secondary nodes 20 enter the effective communication range of the crossroad. If the primary node 10 does not exist, it is then selected from the secondary nodes 20 through a primary node selection procedure. The primary node gives different priorities to the threat correlation groups according to their threat levels. Information of threatening vehicles is transmitted to threat correlation groups with high priorities. The primary node 10 further confirms whether the acknowledging packets from al the secondary nodes 20 in the threat correlation group have been received. The location of the threatening vehicle is sent to all the secondary nodes 20. This technique prevents buildings from blocking warnings. The primary node 10 can be a Road-Side unit (RSU) fixed on the roadside or selected from the secondary nodes 20 entering the crossroad.

Figure 2:
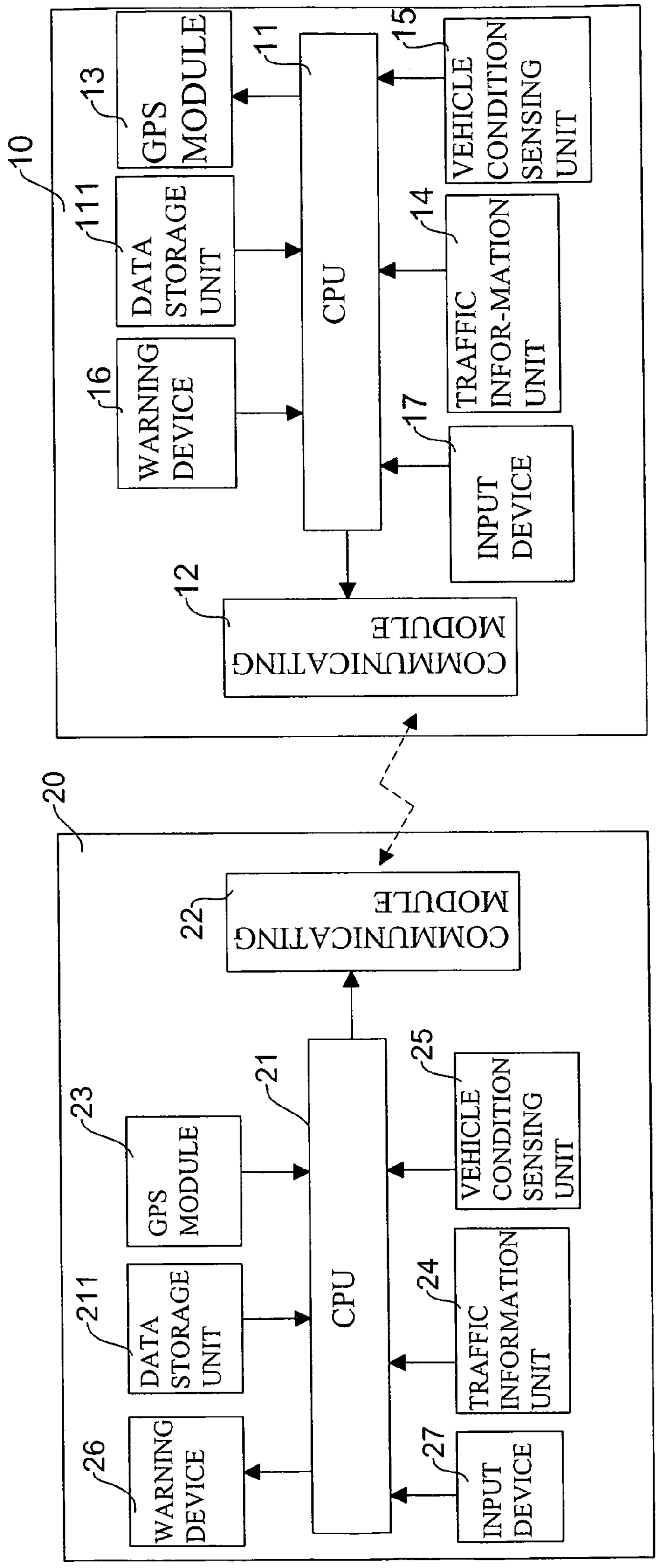
FIG. 2 is a system block diagram of the invention.

Please refer to FIG. 2. The primary node 10 and the secondary nodes 20 are all on the vehicles in motion. Each of them has: a central processing unit (CPU) 11,21, a communicating module 12, 22, a global positioning system (GPS) module 13, 23, a traffic information unit 14, 24, a vehicle condition sensing unit 15, 25, a warning device 16, 26, and an input device 17, 27.

The CPU 11, 21 is built in with a primary node selection and transfer procedure, a broadcasting procedure, and an anti-collision warning procedure. The CPU 11, 21 further connects to a data storage unit 111, 211 stored with a vehicle identification number (VIN). When being set as a primary node 10, the CPU 11, executes the primary node transfer procedure. When being a secondary node 20, it executes the primary node selection procedure.

Figure 8A:
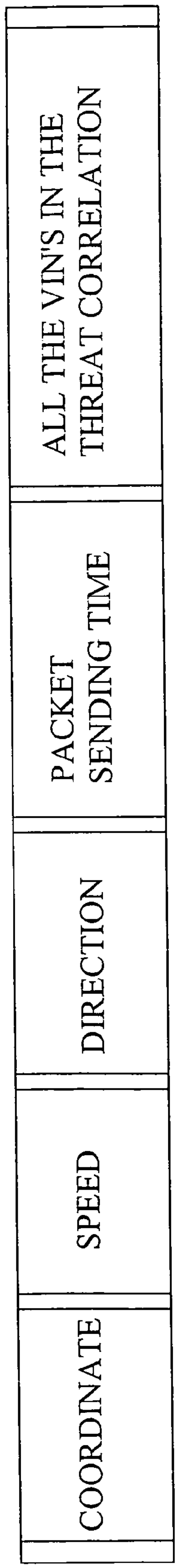
FIGS. 8A and 8B show two different formats of driving information according to the invention.

The communicating module 12, 22 connects to the CPU 11, 21 and forms dual connections with communicating modules using the same communication channel and protocol. It receives driving messages of other vehicles and sends it to the CPU 11, 21, and broadcasts the driving message output from the CPU 11, 21. As shown in FIG. 8A, the driving massage message includes at least coordinates, speed, direction, transmitting time, and the VIN.

The GPS module 13, 23 connects to the CPU 11, 12 and receives positioning signals from satellite. It extracts at least coordinate, time and speed data from the positioning signals and sends them to the CPU 11, 21.

The traffic information unit 14, 24 connects to the CPU 11, 21 and stores crossroad geography information (e.g., geography coordinates thereof) and traffic administration information (e.g., traffic light, light changing time, road speed limit, road construction, traffic accidents, etc).

The vehicle condition sensing unit 15, 25 reflects the conditions of the current vehicle and the surrounding environment (e.g., turning light, wiper, tire pressure, headlight, etc) to the CPU 11, 21.

The warning device 16, 26 connects to the CPU 11, 21. It is driven by the CPU 11, 21 to send a warning to the diver. In this embodiment, the warning device is a display or a buzzer.

The input device 17, 27 connects to the CPU 11, 21 for the driver to set or cancel the warning signal of the warning device.

Figure 3:
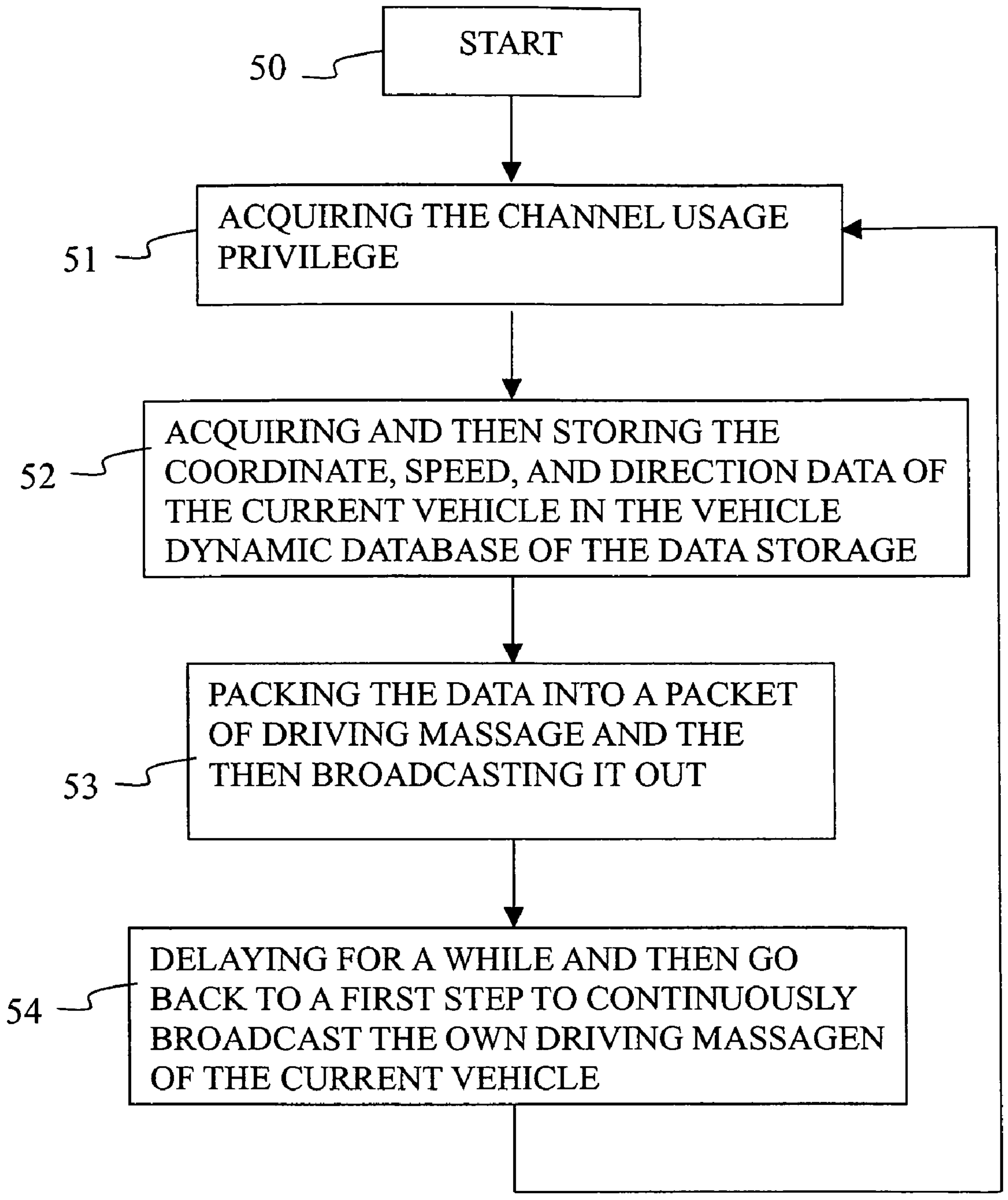
FIG. 3 is a flowchart of the broadcasting procedure according to the invention.

Since the CPU 11 is connected with the GPS module 13, 23, it can obtain the coordinate, speed, and direction data of the current vehicle. The following describes the broadcasting procedure of the CPU 11, 21. Please refer to FIG. 3. After the procedure starts (step 50), the CPU 11, 21 acquires the channel usage privilege (step 51) and the coordinate, speed, and direction data of the current vehicle. They are stored in the vehicle dynamic database of the data storage unit (step 52). Afterwards, the data are packed into a packet of driving message and the packet is broadcast out (step 53). Once this is completed, the CPU 11, 21 returns the channel usage privilege. After a certain time, the above-mentioned steps are repeated again. Therefore, the CPU 11, 21 continuously broadcasts the driving messages of the current vehicle (step 54).

Figure 4:
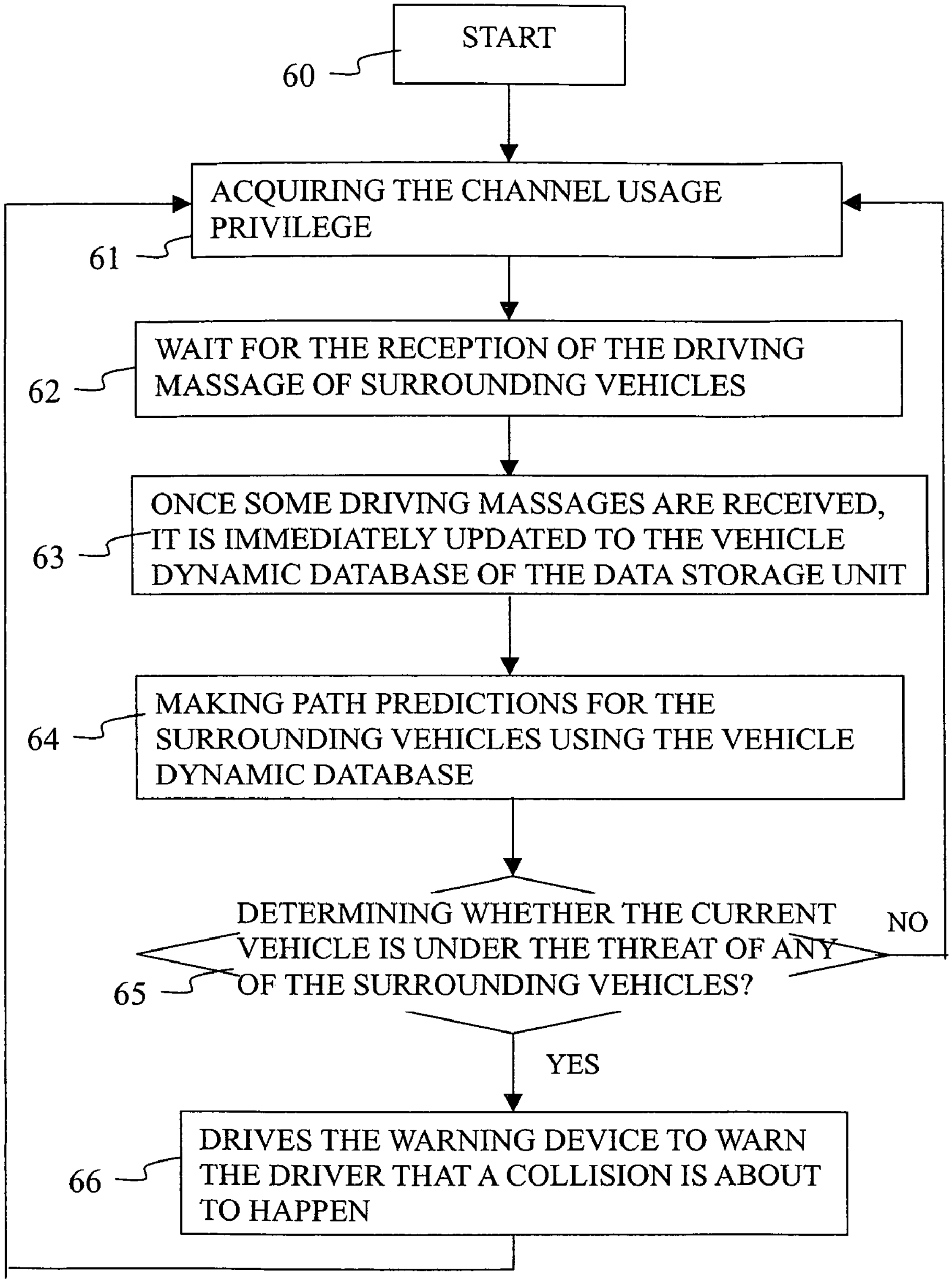
FIG. 4 is a flowchart of self-warning in the disclosed anti-collision warning procedure.

As shown in FIG. 4, the CPU 11, 21 of each vehicle continuously receives the driving messages of nearby vehicles and executes the anti-collision warning procedure in order to achieve the self-warning effect in different roads. After the procedure starts (step 60), the CPU 11, 21 acquires the channel usage privilege (step 61) to wait for the reception of the driving messages of surrounding vehicles (step 62). Once some driving messages are received, it is immediately updated to the vehicle dynamic database of the data storage unit (step 63). The CPU 11, 21 then makes path predictions for the surrounding vehicles using the vehicle dynamic database (step 64), and determines whether the current vehicle is under the threat of any of the surrounding vehicles (step 65).

If not, the procedure goes back to step 62. Otherwise, the CPU 11, 21 drives the warning device to warn the driver that a collision is about to happen (step 66). However, as shown in FIG. 1, the buildings 43 around the crossroad still prevent vehicles entering the crossroad from obtaining the driving messages of all other vehicles. So even with such a self-warning function, no immediate and effective warning is attained.

Figure 5:
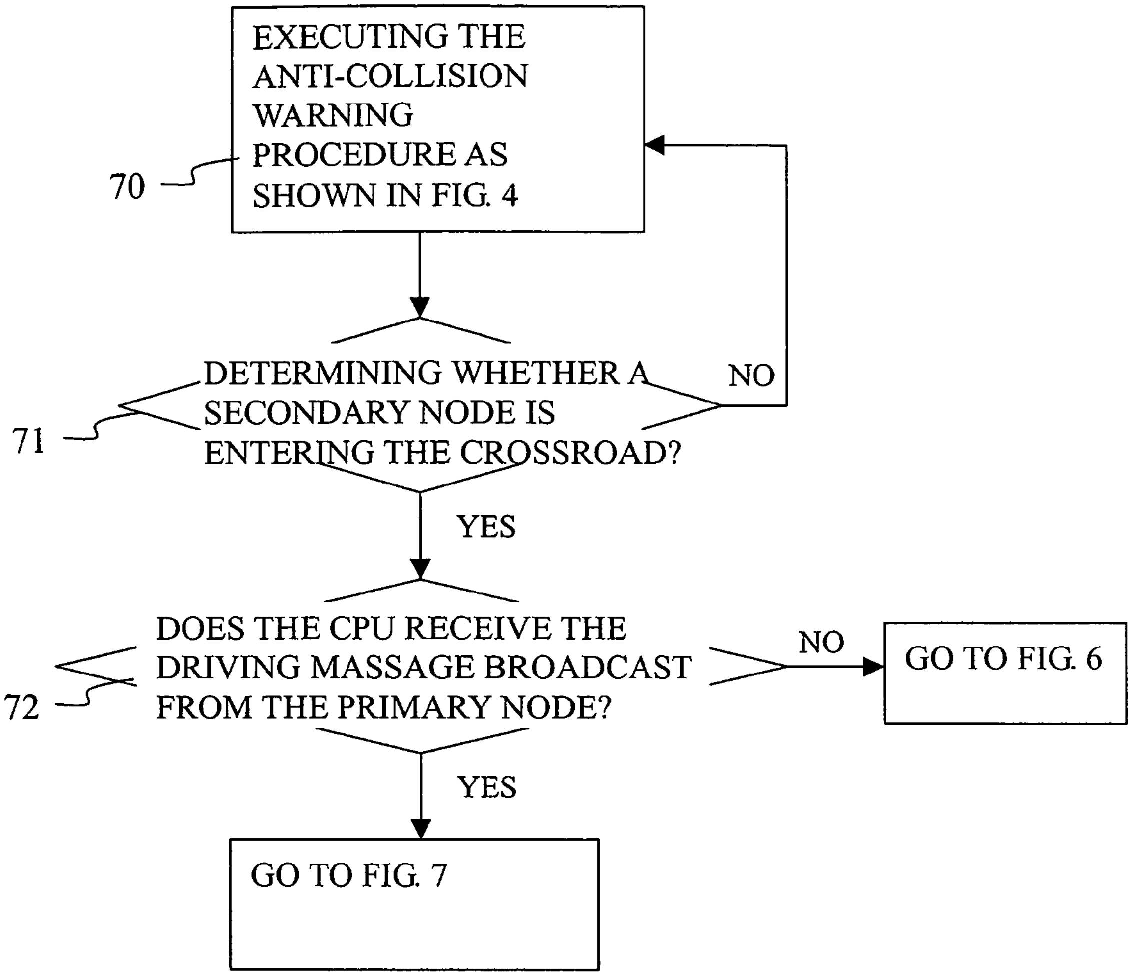
FIG. 5 is a flowchart of the disclosed anti-collision warning procedure.

Therefore, as shown in FIG. 5, the CPU 11, 21 determines whether a secondary node is entering the crossroad (step 71) in addition to running the above-mentioned self-warning function (step 70). If there is a secondary node entering the crossroad, the CPU 11, 21 determines whether the driving messages broadcast from the primary node is received (step 72). This then renders a more timely and effective warning effect. In other words, when the CPU 11, 21 determines according to the GPS module and the traffic information unit that the current vehicle is entering the crossroad, it immediately determines whether the driving messages broadcast from a primary node is received.

Figure 6:
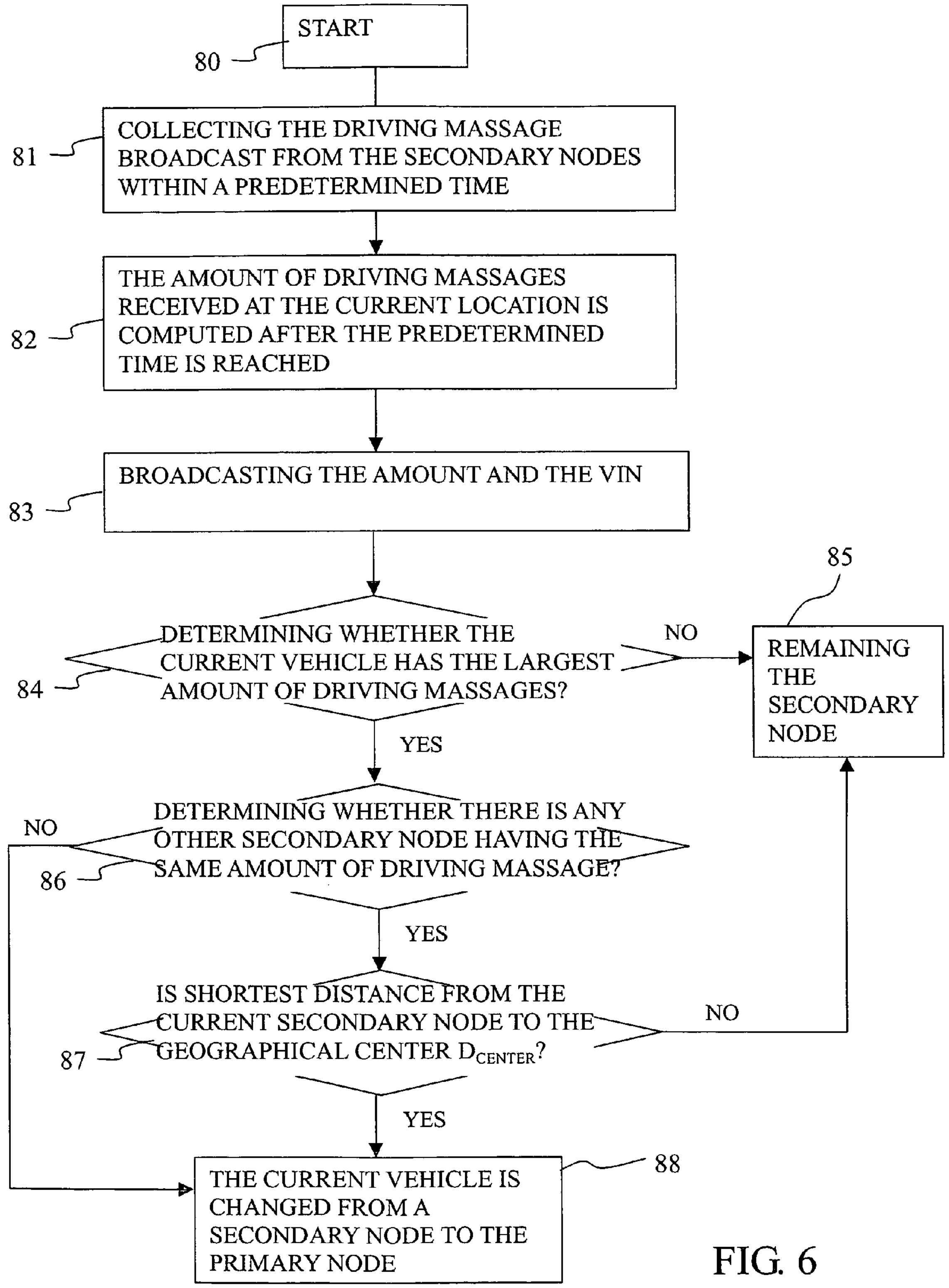
FIG. 6 is a flowchart of the disclosed primary node selection procedure.

1. If the driving messages broadcast from the primary node 10 is not received, the primary node selection procedure is executed within a predetermined time T. The detailed steps of the primary node selection procedure are described as follows, with reference to FIG. 6.

Figure 8B:
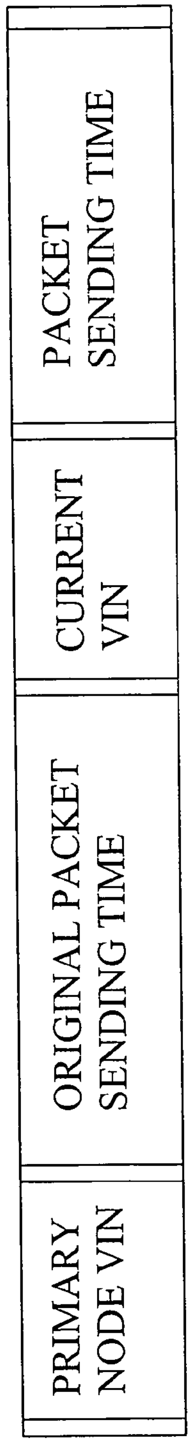

After the procedure starts (step 80), the driving messages broadcast from the secondary nodes is collected within a predetermined time (step 81). The amount of driving messages received at the current location is computed. When the predetermined time T is reaches (step 82), the invention broadcasts the VIN, the driving messages amount $V_N$, the distance to the geographical center $d_{CENTER}$, and the staring time t (step 83). At this moment, the CPU 11, 21 can determine whether the current vehicle has the largest amount if driving messages (step 84). If not, it remains as a secondary node (step 85). If yes, then it further determines whether there is any other secondary node having the same amount of driving messages (step 86). If there is no one else, then the current vehicle is changed from a secondary node to the primary node (step 88). If there are other vehicles with the same largest amount of driving message, then their distances to the geographical center $d_{CENTER}$ are compared (step 87). The shortest one means that it has the best geographical position for communications at the crossroad, and it is changed from a secondary node to the primary node (step 88). Otherwise, it remains as a secondary node and some other secondary node is promoted to the primary node (step 85). The so-called distance to geographical center is the distance between a vehicle and the center of the crossroad, as shown in FIG. 1. For the convenience in calculations, one can use the center of the crossroad as the center and draw several concentric circles with different radii (r1, r2, r3). Therefore, each vehicle can report which circle it is located on. Once a vehicle changes form a secondary node 20 to the primary node 10, the primary node 10 takes the driving message of each secondary node 20 and uses an anti-collision algorithm to find out a possible path of the secondary node 20. According to the possible paths of the other vehicles, the primary node 10 determines threat relations among them and thereby establishes at least one threat correlation group. If there are several threat correlation groups (e.g., two or more threat correlation groups), then the primary node associates each of them with a priority according to their threat levels. Afterwards, it selects those threat correlation groups with high priorities and sends broadcasting packets to them, as shown in FIG. 8A. The broadcasting packet includes: coordinate, speed, direction, packet sending time, and all the VIN's in the threat correlation group. After a secondary receives this broadcasting packet and reads its own VIN, it automatically returns an acknowledging packet ACK. As shown in FIG. 8B, this method ensures that each secondary node in the high-priority threat correlation group can receive the driving messages of each other and make warnings. If any of them does not receive the broadcasting packet, it is sent again. Therefore, the secondary nodes 20 in a threat correlation group with high priority can indeed receive timely and effective warnings from the primary node.

Figure 7:
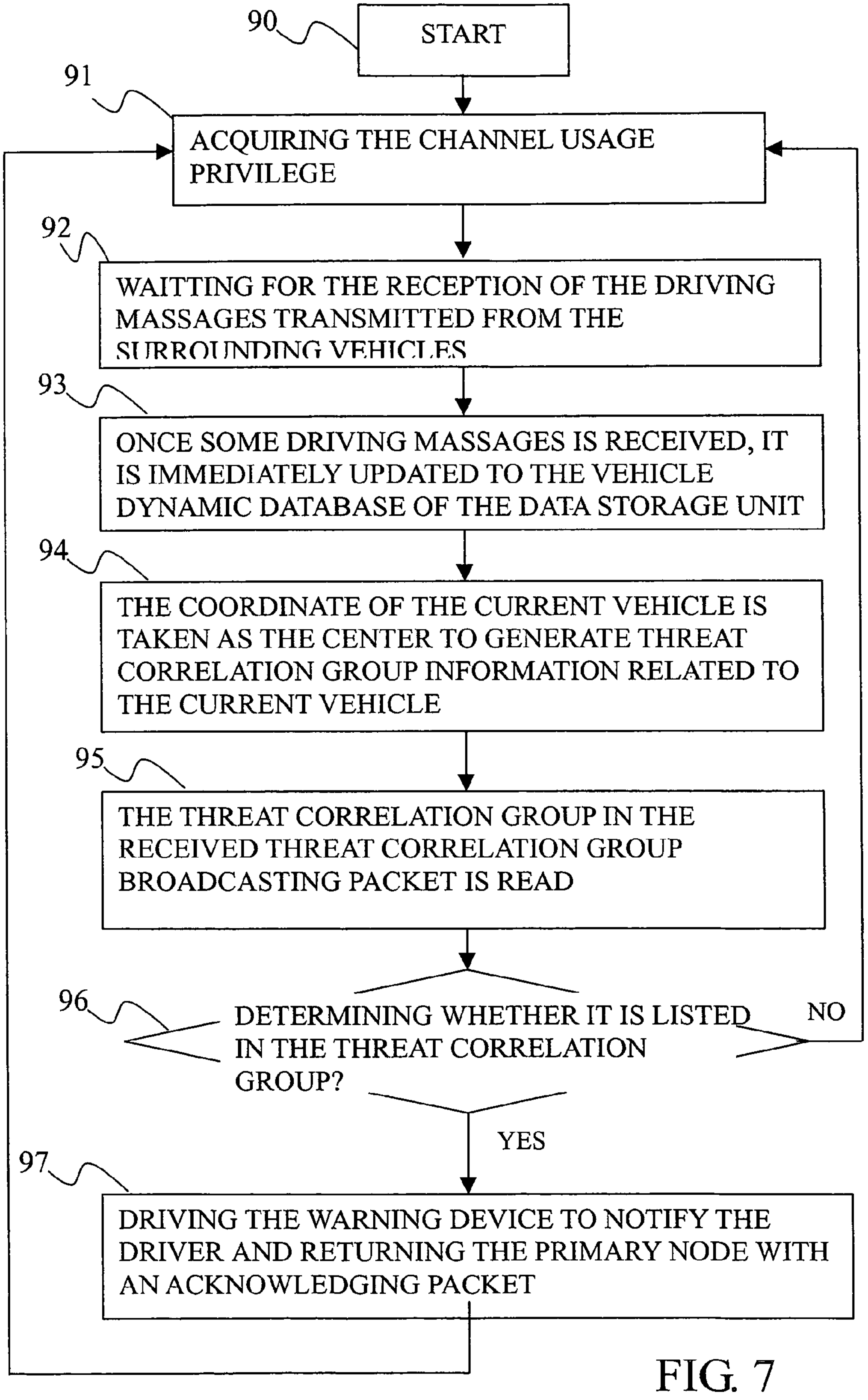
FIG. 7 is a flowchart of the warning in the disclosed anti-collision warning procedure.

2. If the CPU of the current vehicle has received driving messages broadcast from the primary node 10, it continuously receive the driving messages broadcast from the primary node and other secondary nodes in addition to broadcasting the driving message of the current vehicle. The CPU then performs the anti-collision algorithm according to the received driving messages and sends warnings to the driver if necessary. The following explains detailed steps of the warning with reference to FIG. 7.

After the procedure starts (step 90), the CPU acquires the channel usage privilege (step 91) to wait for the reception of the driving messages transmitted from the surrounding vehicles (step 92). Once some driving messages is received, it is immediately updated to the vehicle dynamic database of the data storage unit (step 93). The CPU makes path predictions for the surrounding vehicles according to the vehicle dynamic database. The coordinate of the current vehicle is taken as the center to generate threat correlation group information related to the current vehicle (step 94). It further reads out the threat correlation group in the received threat correlation group broadcasting packet (step 95). It then uses the VIN of the current vehicle to determine whether it is listed in the threat correlation group (step 96). If so, then the CPU drives the warning device to notify the driver that a collision is about to happen. It further returns the primary node with an acknowledging packet (step 97). If not, then the procedure goes back to step 91 until the secondary node leaves the crossroad. Please refer to FIG. 8B. The acknowledging packet includes a primary node VIN, original packet sending time, current VIN, and packet sending time.

According to the above description, when a vehicle is about to enter a crossroad, the disclosed network administration system selects a secondary node as the primary node. The primary node has the feature of receiving the most driving messages broadcast from the vehicles around the crossroad. It evaluates the threat relations according to the driving messages. That is, the driving messages are filtered. The primary node then notifies each member in the threat correlation group. After the primary node is selected, it means that the corresponding vehicle is at a position with the least problem in receiving driving messages. Therefore, the disclosed network administration system ensures that vehicles entering a crossroad do not experience difficulty in communications due to the roadside buildings. Warnings can still be timely delivered to the drivers.

Figure 9:
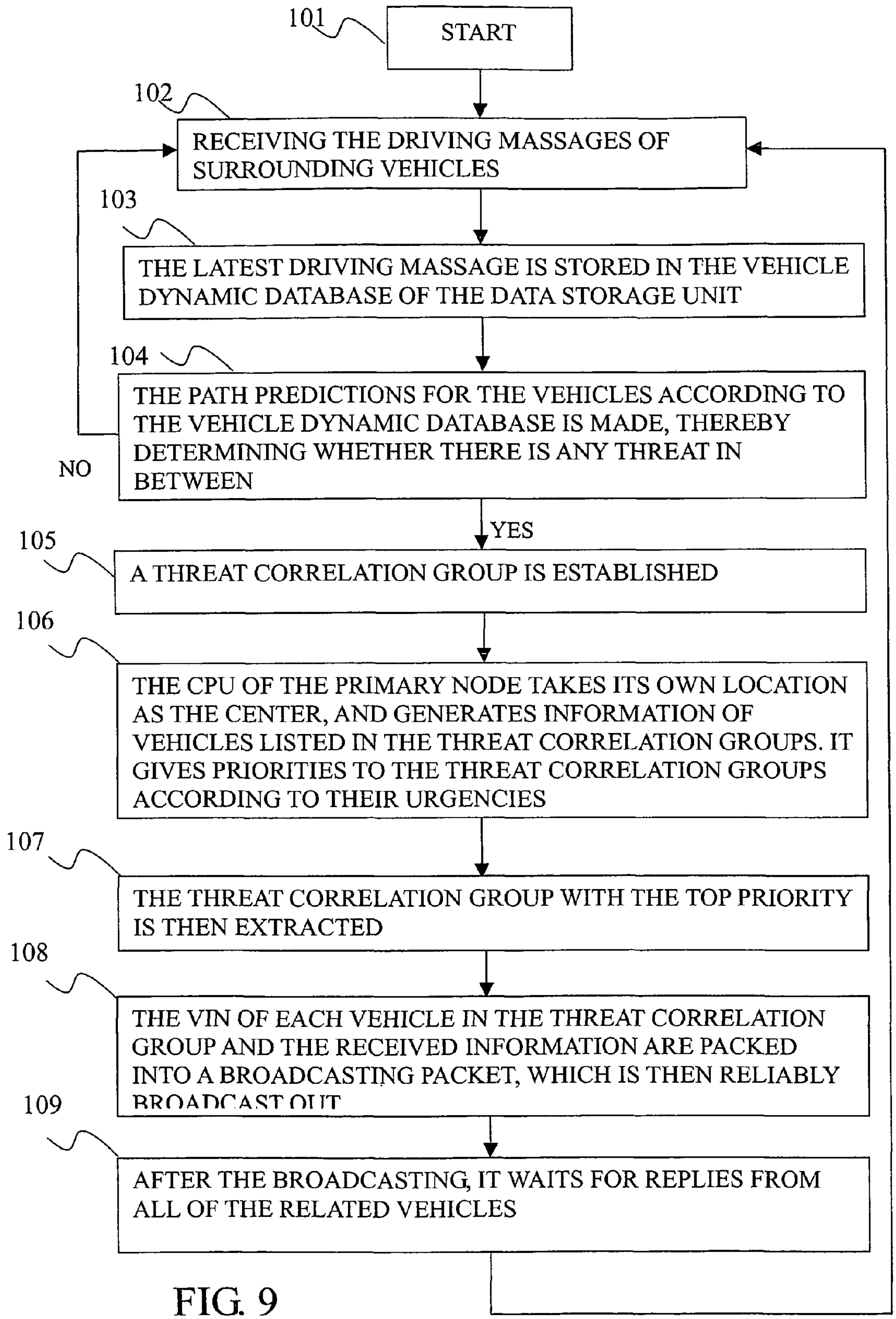
FIG. 9 is a flowchart of establishing threat correlation groups according to the invention.
Figure 10:
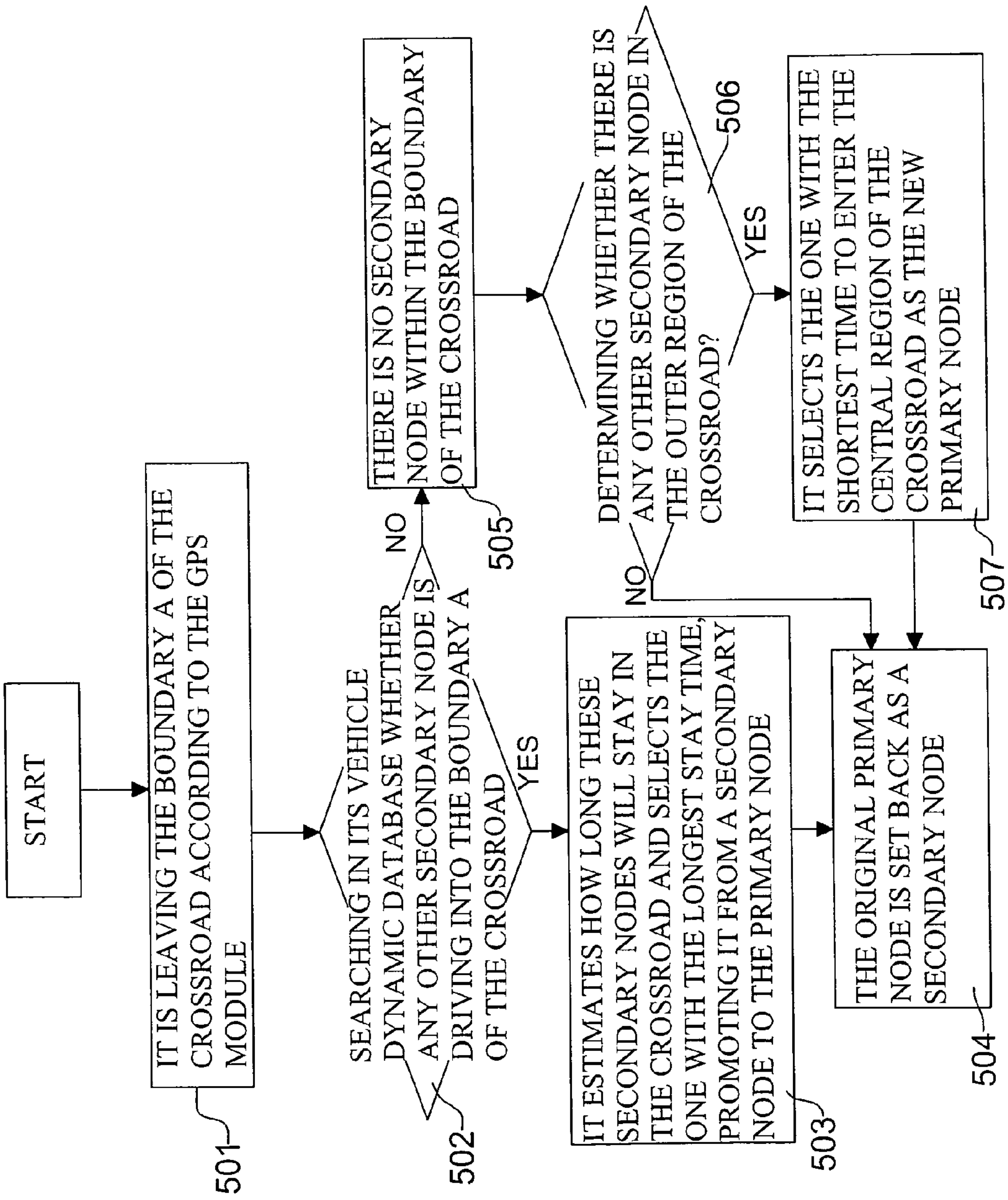
FIG. 10 is a flowchart of the primary node transfer procedure according to the invention.

Please refer to FIG. 9. The following paragraphs explain detailed steps in the procedure of establishing threat correlation groups by the primary node.

After the procedure starts (step 101), the CPU receives the driving messages of surrounding vehicles (step 102). The latest driving messages is stored in the vehicle dynamic database of the data storage unit (step 103). The CPU then makes path predictions for the vehicles according to the vehicle dynamic database, thereby determining whether there is any threat in between (step 104). If there is, then a threat correlation group is established (step 105). If not, then the procedure goes back to step 102 for continuously receiving driving messages of surrounding vehicles. If several threat correlation groups are established, then the CPU of the primary node takes its own location as the center, and generates information of vehicles listed in the threat correlation groups. It gives priorities to the threat correlation groups according to their urgencies (step 106). The threat correlation group with the top priority is then extracted (step 107). The VIN of each vehicle in the threat correlation group and the received information are packed into a broadcasting packet, which is then reliably broadcast out (step 108). After the broadcasting, it waits for replies from all of the related vehicles (step 109). The broadcasting continuous until all the acknowledging messages have been received. After the above steps are completed, it starts to broadcast to the threat correlation group of second priority, and so on. After broadcasting to all the threat correlation groups and receiving all of their acknowledging packets, the procedure goes back to step 102. This process repeats until the current vehicle is changed from the primary node to a secondary node.

Since the primary node will eventually leave the crossroad, the disclosed network administration system provides a primary node transfer procedure, as shown in FIGS. 1 to 10. The CPU of the primary node keeps checking whether it is leaving the boundary A of the crossroad according to the GPS module (step 501). Once it is determined to drive away from the boundary A, it immediately searches in its vehicle dynamic database whether any other secondary node is driving into the boundary A of the crossroad (step 502). If there are, it estimates how long these secondary nodes will stay in the crossroad and selects the one with the longest stay time, promoting it from a secondary node to the primary node (step 503). The original primary node is set back as a secondary node (step 504). If no vehicle is entering the boundary, it means that there is no secondary node within the boundary of the crossroad (step 505). The CPU of the current primary node continues to determine whether there is any other secondary node in the outer region of the crossroad (step 506). If there is, it selects the one with the shortest time to enter the central region of the crossroad as the new primary node (step 507), and the original primary node is set back as a secondary node (step 504). If there is no vehicle in the outer region of the crossroad, the current primary node is simply set back as a secondary node after it leaves the crossroad (step 504). The new primary node is selected according to the primary node selection procedure from the vehicles that enter the crossroad at a later time.

Figure 11:
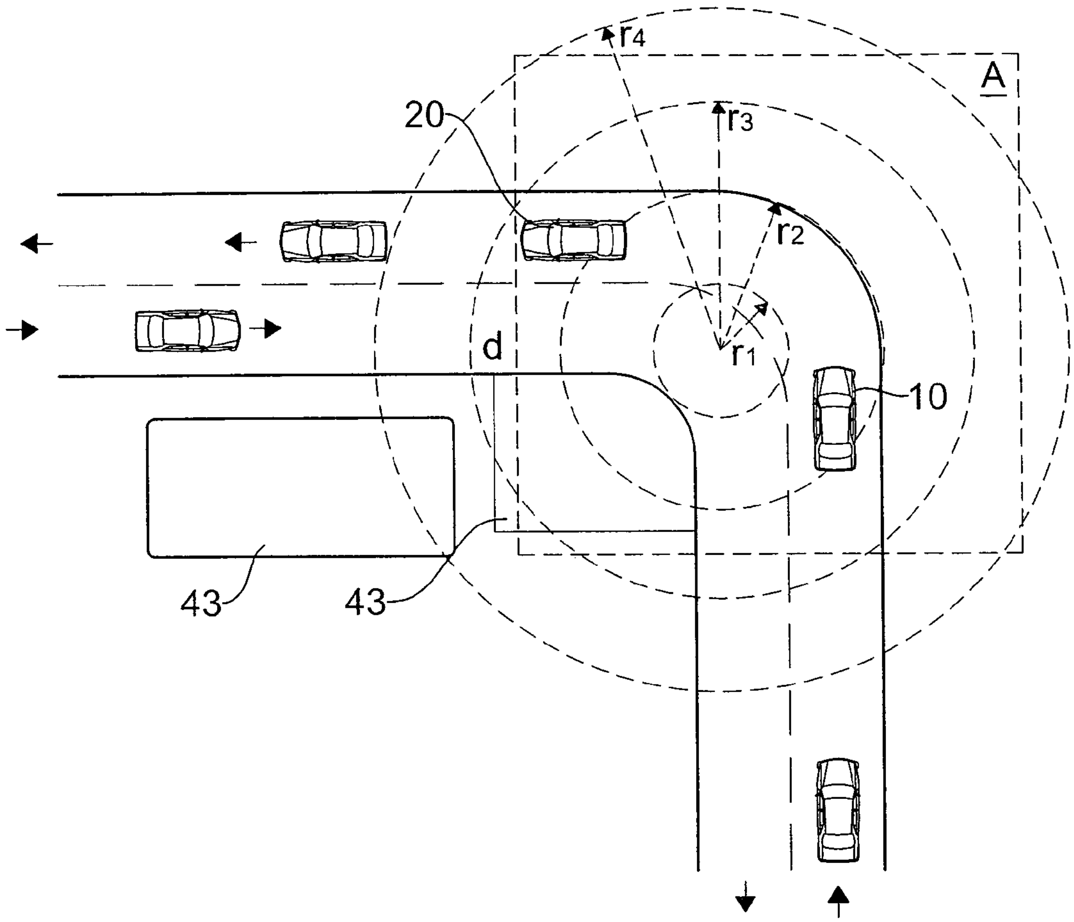
FIG. 11 is a schematic view of the invention used in a two-way crooked road.
Figure 12:
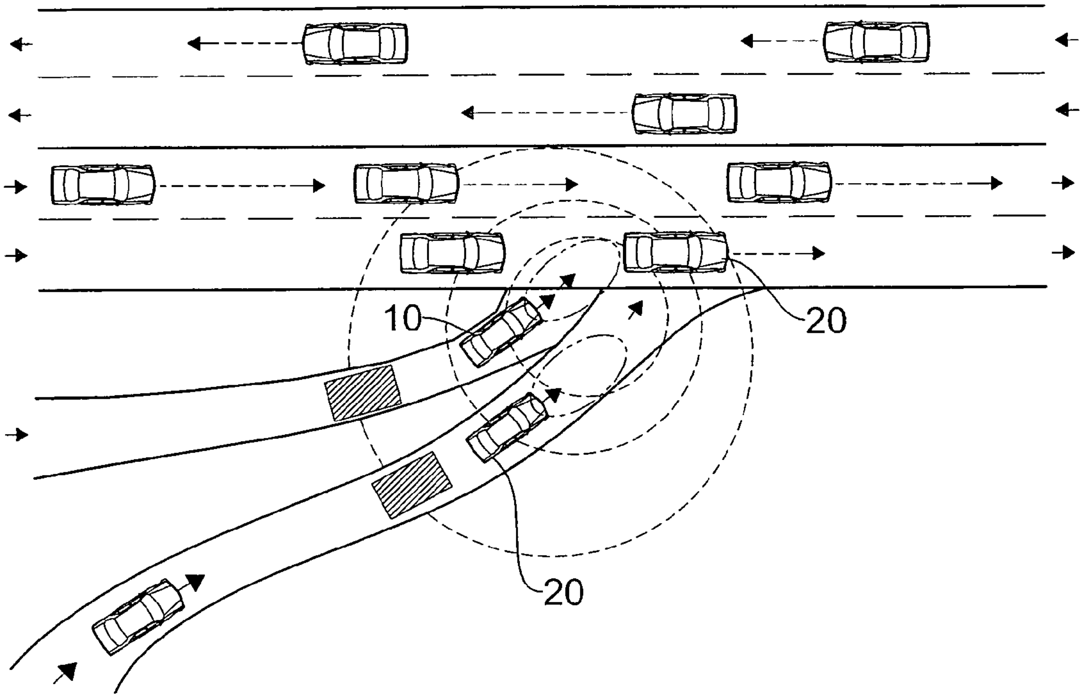
FIG. 12 is a schematic view of the invention used at a junction of a high speed way.

Please refer to FIG. 11 and FIG. 12. The network administration system applies to vehicles located at a two-way crooked road and a junction of a high speed way and a branch road thereof. Since the CPU of each vehicle is further connected to a GPS and the traffic information unit, the CPU calculates a geographical center of the crooked road or the junction. The four circles with different radii (r1, r2, r3, r4) are drawn on the crooked. The three circles are drawn on the junction according to different vehicle densities. Further, different priorities are given to different circles. Therefore, the CPU refers to the locations of the secondary nodes to execute the primary node transfer procedure.

Figure 13:
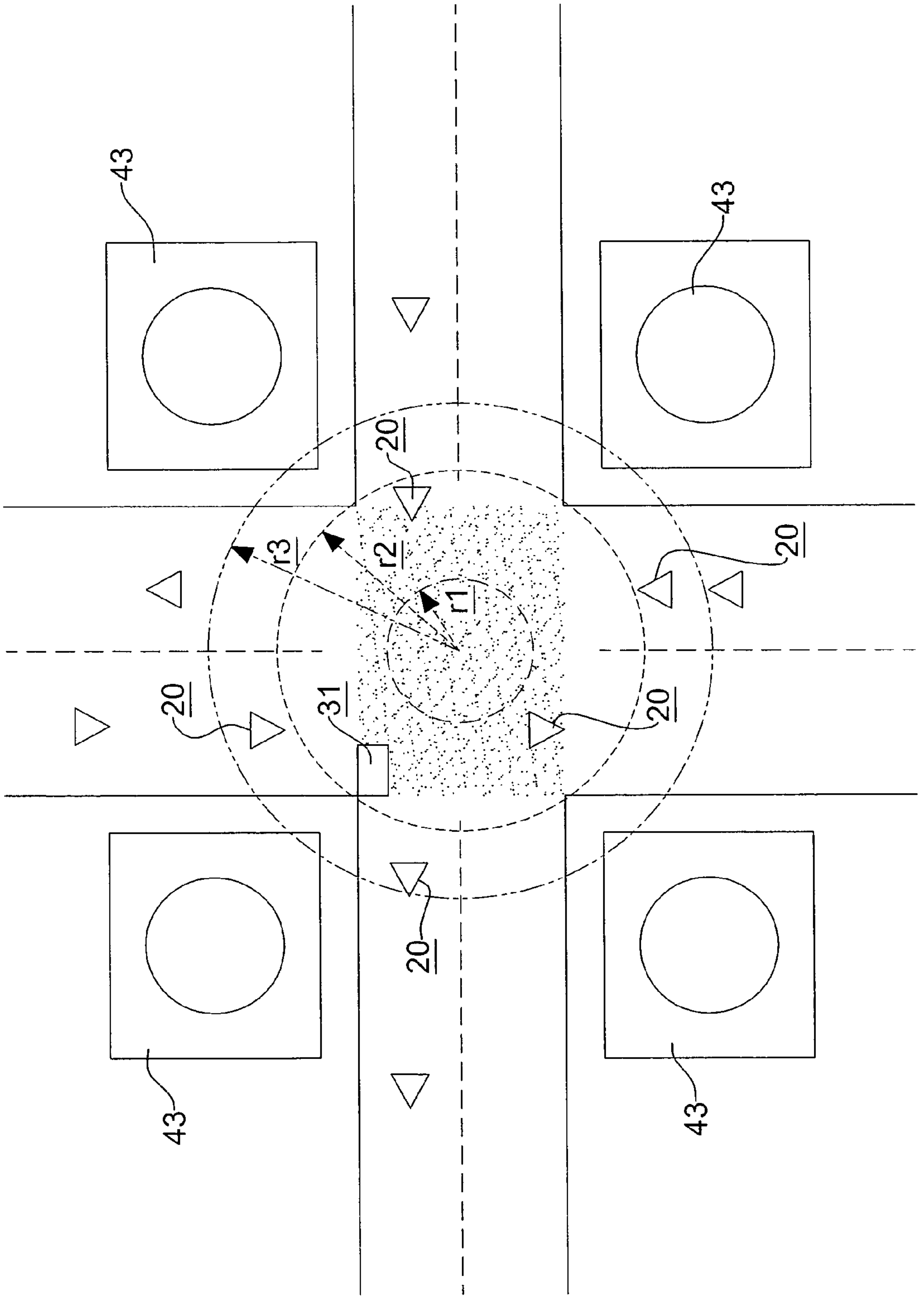
FIG. 13 is a schematic view of the second embodiment of the invention used at a crossroad.
Figure 14:
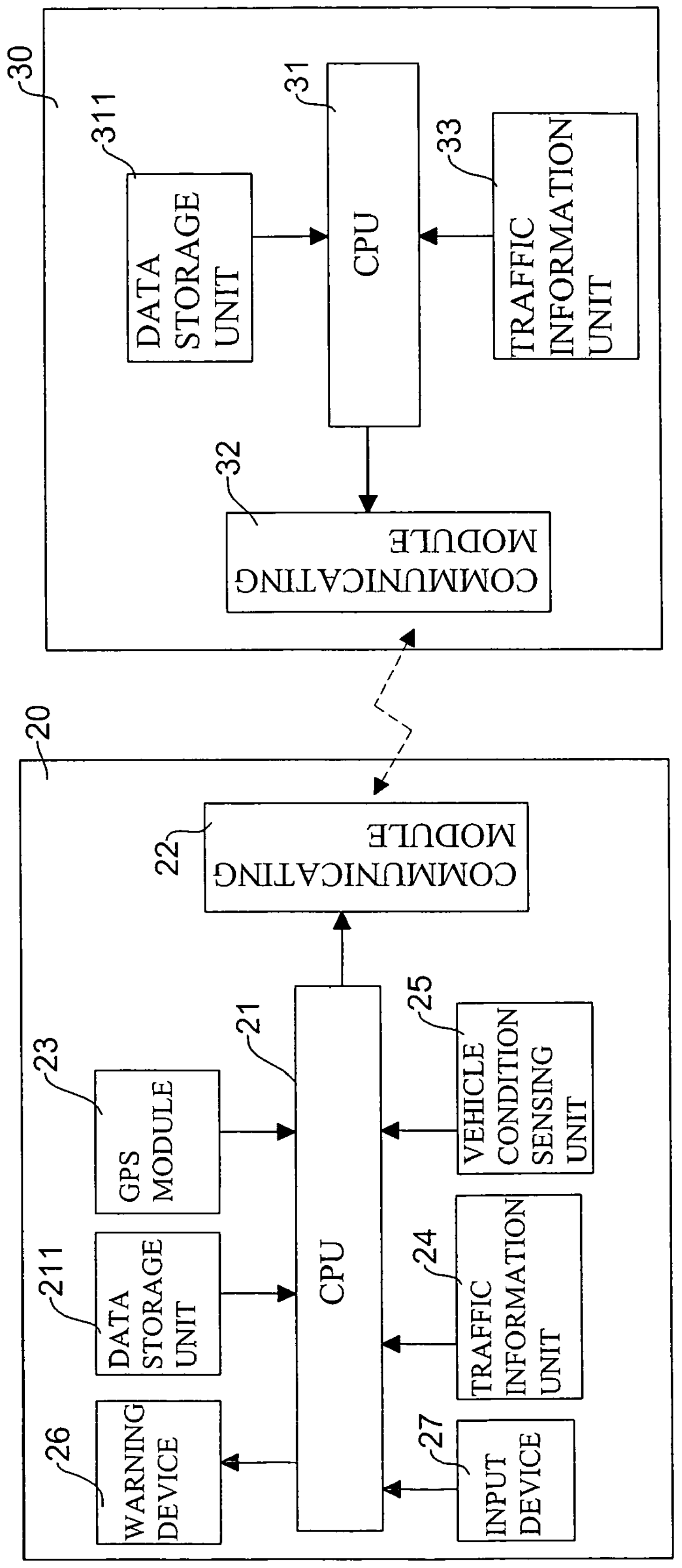
FIG. 14 is a block diagram of the second embodiment.
Figure 15:
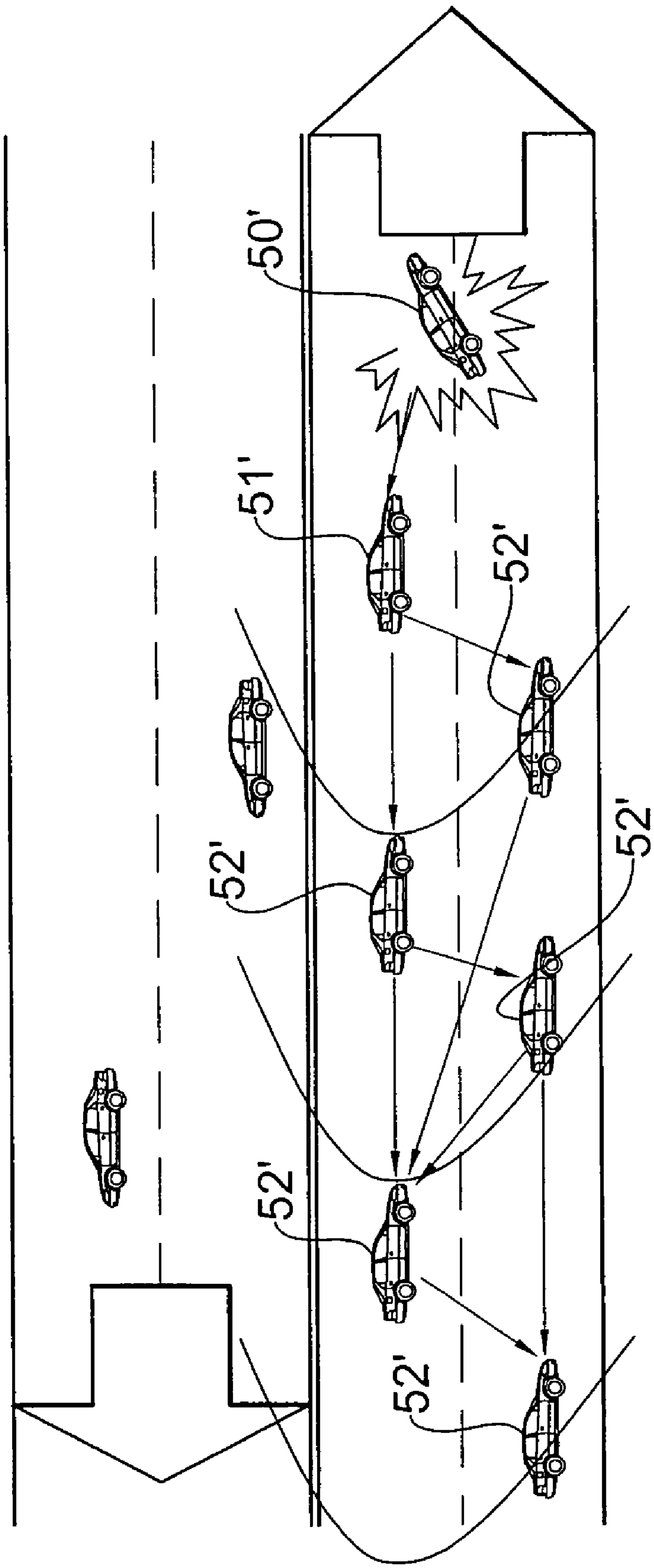
FIG. 15 PRIOR ART
FIG. 15 is a schematic view implemented by a conventional system for exchanging vehicle messages between vehicles in a specific network in accordance with the prior art.
Figure 16:
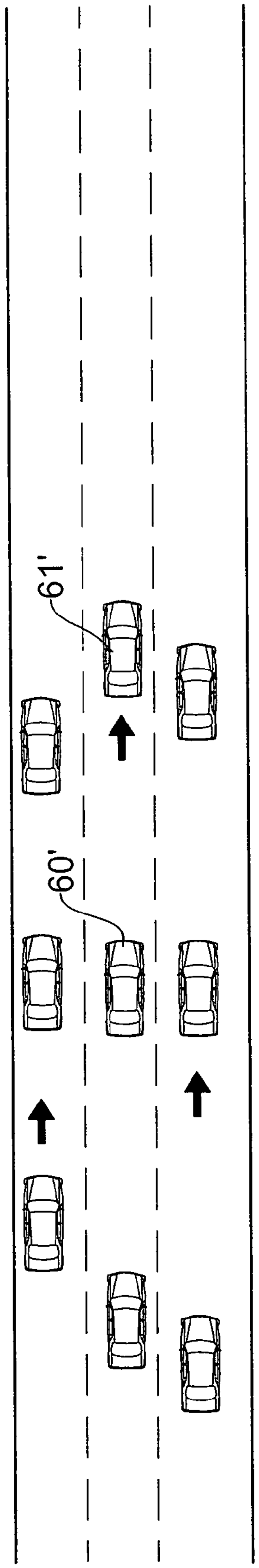
FIG. 16 PRIOR ART
FIG. 16 is a schematic view implemented by a communication protocol in accordance with the prior art.

Please refer to FIG. 13 for a second embodiment of the invention. The primary node 30 in this case is an RSU. The primary node can be installed on a traffic light or roadside sign at the crossroad as well. The secondary nodes 20 are still those vehicles in motion. As shown in FIG. 14, each vehicle in the embodiment does not need to have a built-in primary node selection procedure in its CPU 11. The RSU includes a CPU 31, a communicating module 32, and a traffic information unit 33.

The CPU 31 is built in with a broadcasting procedure, and an anti-collision warning procedure. The CPU is further connected with a data storage unit 311 for storing the VIN's.

The communicating module 32 connects to the CPU and has dual connections with communication modules using the same communication channels and protocol. It receives the driving messages of nearby vehicles and sends it to the CPU 31. It further broadcasts the driving message output from the CPU 31. As shown in FIG. 8A, the driving message includes at least: coordinate, speed, direction, sending time, and current VIN.

The traffic information unit 33 connects to the CPU 31. It stores crossroad geography information (e.g., geography coordinates thereof) and traffic administration information (e.g., traffic light, light changing time, road speed limit, road construction, traffic accidents, etc).

This embodiment uses an RSU as the primary node 30. The vehicles entering the crossroad can receive the driving messages broadcast from the primary node 30. When a vehicle is in an effective communication range of the RSU, the RSU executes the procedure of establishing threat correlation group's, as shown in FIG. 9. Therefore, after entering the crossroad, each vehicle can receive the driving messages broadcast from the RSU and determines as in FIG. 7 whether it is listed in the threat correlation group. If it is, then the CPU drives the warning device to notify the driver about the location of the threatening vehicle.

Based on the above description, this invention, driving safety auxiliary network administration method includes the following steps. Each vehicle continuously sends out the driving messages thereof and receives the driving messages of other vehicles. The driving message includes at least speed, direction, and location of the vehicle.

The driving message of other vehicles is used to determine whether any of them is potentially dangerous to the current vehicle. A warning is sent out if there is such a dangerous vehicle.

It also determines whether the driving message of other vehicles is broadcast from the primary node. If not, each vehicle accumulates the amount of driving messages broadcast from other secondary nodes in a predetermined time. After the predetermined time is reached, all of the vehicles broadcast their accumulated amount of driving messages. The secondary node with the highest accumulated amount of driving messages are set as the primary node. Once the primary node is determined, it determines a possible path for each secondary node according to the received driving messages, thereby determining at least one threat correlation group. It then associates the threat correlation groups with different priorities by comparing their urgencies. The threat correlation groups with high priorities are extracted. The primary node first transfers broadcasting packets to these high-priority threat correlation groups and checks whether acknowledging packets ACK from the secondary nodes in the threat correlation groups are replied according to the priorities. If some acknowledging packets are not received, then the broadcasting packets are sent to the corresponding secondary nodes in the threat correlation groups again until acknowledging packets are received. If the driving messages of other vehicles is broadcasted from the primary node, then the secondary node simultaneously receives the driving messages broadcast from the primary node and other secondary nodes in addition to broadcasting its own driving messages.

Therefore, the disclosed auxiliary network administration system and the method thereof find a primary node that can receive the driving messages broadcast from most vehicles ib the communication range. The primary node immediately performs an anti-collision algorithm to establish at least one threat correlation group. It further transfers broadcasting packets according to the priorities of the threat correlation groups. In addition to reducing the broadcasting packets transferred among the vehicles, driving messages of great importance can be transmitted and received in time, enhancing the warning effects for the vehicles. To ensure the reception of the broadcasting packets by the secondary nodes in the threat correlation groups, the primary node forces each of the secondary nodes to return an acknowledging packet after receiving the broadcasting packet. Since the primary node only transfers the driving messages of vehicles in the broadcasting packet, eventually it is each individual vehicle that determines whether there is any potential danger around the vehicle.

As a result, the disclosed driving safety auxiliary network administration method can prevent obstacles near the crossroad from blocking the communications and warnings among the vehicles. The disclosed method can make sure that the secondary nodes in each threat correlation group can receive important broadcasting packets within the shortest time through more efficient and reliable communication means. The warnings thus produced are timely and effective.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving safety auxiliary network administration system, comprising:

a) a plurality of secondary nodes connected with each other within an effective communication range, each of which broadcasts its own driving message thereof and receives the driving messages of other secondary nodes having a vehicle identification number (VIN), determining and warning about a potential danger according to the received messages of the other secondary nodes; and b) a primary node connected with the secondary nodes within the effective communication range for collecting the driving messages of the secondary nodes and broadcasting the driving messages thereof;

wherein the primary node performs an anti-collision algorithm according to the collected driving messages and obtains a possible path of at least one secondary node, finds threat relations among the vehicles according to the possible paths and establishes at least one threat correlation group, assigns priorities to the threat correlation groups according to their threatening levels, and sends a broadcasting packet to the secondary nodes in each of the threat correlation groups according to the priorities until all of the secondary nodes of each of the threat correlation groups have returned an acknowledging packet;

each secondary node including a primary node selection procedure including the steps of:

a) collecting messages broadcast from the secondary nodes in a predetermined time, computing the amount of driving messages received at the current position, and broadcasting the VIN, the amount of driving messages, the distance to a geographical center, and sending time when the predetermined time is reaches;

b) determining whether the amount of driving messages collected by the vehicle is more than the other secondary nodes;

c) remaining as the secondary node if it does not have more amount of driving messages; and d) determining whether there is any other secondary node with the same amount of driving messages if it has more amount of driving messages and, if not, changing itself from the secondary node to the primary node or, if yes, comparing the distance from the vehicle and the other secondary nodes with the same amount of driving messages to the geographical center and changing itself from the secondary node to the primary node when the distance is the shortest or remaining itself as the secondary node if it is not.

2. The driving safety auxiliary network administration system as claimed in claim 1, wherein each of the secondary nodes comprises:

a) a central processing unit (CPU), which is built in the primary node selection procedure, a broadcasting procedure, and an anti-collision warning procedure, and is connected with a data storage unit storing vehicle identification numbers (VIN's);

b) a communicating module, which connects to the CPU and establishes dual connections with communicating modules using the same communication channel and protocol, receives the driving messages of other vehicles and outputs it ti the CPU, and broadcasts the own driving message output from the CPU, the driving message having at least coordinate, speed, direction, and sending time;

c) a GPS module, which connects to the CPU, receives positioning signals from satellite, and extracts at least the coordinate, time, and speed data to the CPU; and d) a warning device, which connects to the CPU and is driven by the CPU to warn the driver.

3. The driving safety auxiliary network administration system as claimed in claim 2, wherein each of the secondary notes includes:

a) a traffic information unit, which connects to the CPU and stores crossroad geography information and traffic administration information; and b) a vehicle condition sensing unit, which connects to the CPU to reflect the conditions of the vehicle and the surrounding environment to the CPU.

4. The driving safety auxiliary network administration system as claimed in claim 2, wherein the primary node and the secondary nodes are installed on the vehicle; and wherein the CPU of each secondary node is further built with the primary node selection procedure selecting the primary node from the secondary nodes.

5. The driving safety auxiliary network administration system as claimed in claim 4, wherein the primary node includes:

a) a CPU, which is built in with a primary node transfer procedure, a broadcasting procedure, and an anti-collision warning procedure, and is connected with a data storage unit storing VIN's;

b) a communicating module, which connects to the CPU and establishes dual connections with communicating modules using the same communication channel and protocol, receives the driving messages of other vehicles and outputs it to the CPU, and broadcasts the driving messages output from the CPU, the driving messages including at least coordinate, speed, direction, sending time, and VIN thereof;

c) a GPS module, which connects to the CPU, receives positioning signals from satellite, and extracts at least the coordinate, time, and speed data to the CPU; and d) a warning device, which connects to the CPU and is driven by the CPU to warn the driver.

6. The driving safety auxiliary network administration system as claimed in claim 5, wherein the primary node further includes:

a) a traffic information unit, which connects to the CPU and stores crossroad geography information and traffic administration information; and b) a vehicle condition sensing unit, which connects to the CPU to reflect conditions of the vehicle and the environment surrounding the vehicle to the CPU.

7. The driving safety auxiliary network administration system as claimed in claim 6, wherein the primary node transfer procedure includes the steps of:

a) reporting a coordinate according to the GPS module and determining whether the vehicle is driving toward the boundary of the crossroad;

b) finding whether there is any other secondary node enters the boundary of the crossroad if the vehicle is determined to be leaving;

if so, estimating the duration of the secondary nodes staying in the crossroads and selecting the one with the longest stay time as the primary node by changing it from the secondary node to the primary node, and executing the following step if not;

c) determining whether there is any secondary node existing in an outer region of the crossroad; and if so, selecting the secondary node that is entering the central region of the crossroad within the shortest time and, if not, setting itself as a secondary node after it leaves the crossroad.

8. The driving safety auxiliary network administration system as claimed in claim 5, wherein the primary node establishes a plurality of threat correlation groups through the steps of:

a) receiving driving messages of other vehicles and storing latest driving messages of surrounding vehicles in a vehicle dynamic database of the data storage unit;

b) making path predictions for vehicles according to the vehicle dynamic database by the CPU and determining whether there is any threat between vehicles according to the predicted paths;

c) establishing a threat correlation group if there is any threat; and d) not establishing any threat correlation group if there is not threat.

9. The driving safety auxiliary network administration system as claimed in claim 6, wherein the primary node establishes a plurality of threat correlation groups through the steps of:

a) receiving driving messages of other vehicles and storing latest driving messages of surrounding vehicles in a vehicle dynamic database of the data storage unit;

b) making path predictions for vehicles according to the vehicle dynamic database by the CPU and determining whether there is any threat between vehicles according to the predicted paths;

c) establishing a threat correlation group if there is any threat; and d) not establishing any threat correlation group if there is no threat.

10. The driving safety auxiliary network administration system as claimed in claim 6, wherein the crossroad geography information includes geography coordinate of the crossroad and the traffic administration information includes traffic light, light changing time, road speed limit, road construction, and traffic accidents.

* * * * *